US012680807B2

(12) United States Patent
Kato et al.

(10) Patent No.: US 12,680,807 B2
(45) Date of Patent: Jul. 14, 2026

(54) OPTICAL HETERODYNE INTERFERENCE MEASUREMENT DEVICE AND OPTICAL HETERODYNE INTERFERENCE MEASUREMENT METHOD

(71) Applicant: HAMAMATSU PHOTONICS K.K., Hamamatsu (JP)

(72) Inventors: Naoaki Kato, Hamamatsu (JP); Yuu Takiguchi, Hamamatsu (JP); Hiroshi Tanaka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 254 days.

(21) Appl. No.: 18/687,468

(22) PCT Filed: Jul. 4, 2022

(86) PCT No.: PCT/JP2022/026606
§ 371 (c)(1),
(2) Date: Feb. 28, 2024

(87) PCT Pub. No.: WO2023/062891
PCT Pub. Date: Apr. 20, 2023

(65) Prior Publication Data
US 2024/0361120 A1      Oct. 31, 2024

(30) Foreign Application Priority Data
Oct. 15, 2021      (JP) ................................. 2021-169280

(51) Int. Cl.
*G01B 9/02002* (2022.01)
*G01B 11/24* (2006.01)
*G01B 11/30* (2006.01)

(52) U.S. Cl.
CPC ...... *G01B 9/02002* (2013.01); *G01B 11/2441* (2013.01); *G01B 11/30* (2013.01)

(58) Field of Classification Search
CPC ............ G01B 9/02002; G01B 9/02007; G01B 11/2441; G01B 11/30
See application file for complete search history.

(56) References Cited

U.S. PATENT DOCUMENTS 6,434,176 B1 *   8/2002   Deck ..................... H01S 3/1396
                                                             372/32
2002/0033441 A1 *   3/2002   Hoshi ................... H04N 25/00
                                                             348/E5.091

(Continued)

FOREIGN PATENT DOCUMENTS

JP      H02-83428 A      3/1990
JP      H2-176512 A      7/1990

(Continued)

OTHER PUBLICATIONS

Atlan, Michael et al. "Spatiaotemporal heterodyne detection". Journal of the Optical Society of America A24, 2007, pp. 2701-2709. (Year: 2007).*

(Continued)

*Primary Examiner* — Michael A Lyons
(74) *Attorney, Agent, or Firm* — Faegre Drinker Biddle & Reath LLP

(57) ABSTRACT

An optical heterodyne interference measurement apparatus includes a beam generation unit, a beam splitter, a mirror, a first photodetector, a linear polarizer, a second photodetector, a linear polarizer, an AD conversion unit, and a computer. The beam generation unit generates and outputs a first light beam and a second light beam having polarizations orthogonal to each other. The first light beam and the second light beam have optical frequencies different from each other by a heterodyne frequency. The computer sets, when $\omega_p$ is set to any peak frequency being temporally constant in a frequency spectrum of intensity noise included in the first light beam or the second light beam output from the beam (Continued)

generation unit, the heterodyne frequency $\omega_h$ to a value of a rational multiple of the peak frequency $\omega_p$.

22 Claims, 10 Drawing Sheets

(56) References Cited

U.S. PATENT DOCUMENTS

| | | | | |
|---|---|---|---|---|
| 2007/0206203 | A1 | 9/2007 | Trainer | |
| 2014/0374575 | A1* | 12/2014 | Takesue | ............. G01B 9/02002 |
| | | | | 250/208.5 |

FOREIGN PATENT DOCUMENTS

| | | | |
|---|---|---|---|
| JP | H08-75434 A | 3/1996 |
| JP | 2002-051357 A | 2/2002 |
| JP | 2010-210541 A | 9/2010 |

OTHER PUBLICATIONS

Huang, Chen-Bin et al. "Quantitative Study of Optical Frequency Noise to Intensity Noise Conversion in Line-by-Line Pulse Shaping". IEEE Journal of Quantum Electronics, vol. 45, No. 6, Jun. 2009, pp. 661-673. (Year: 2009).*

International Preliminary Report on Patentability mailed Apr. 25, 2024 for PCT/JP2022/026606.

* cited by examiner

OPTICAL HETERODYNE INTERFERENCE MEASUREMENT DEVICE AND OPTICAL HETERODYNE INTERFERENCE MEASUREMENT METHOD

TECHNICAL FIELD

The present disclosure relates to a measurement apparatus and a measurement method using optical heterodyne interference.

BACKGROUND ART

A detection band of a photodetector for detecting an intensity of light is much lower than a frequency of the light to be detected. For this reason, the photodetector can only measure the temporally averaged light intensity, and cannot directly measure a phase of the light.

When a first light beam or a second light beam is provided with information on a measurement object as phase information, and an intensity of light obtained by combining and interfering the first light beam and the second light beam is detected by a photodetector, a value of a detection signal output from the photodetector is a value corresponding to the phase information, and thus, the information on the measurement object can be acquired. However, in this case, it is necessary that the intensity of each of the first light beam and the second light beam is known.

Further, when noise is included in the intensity of the first light beam or the second light beam, accurate phase information cannot be obtained. Examples of the noise include intensity variation of output light of a light source derived from temperature variation, intensity variation of a frequency (50 Hz or 60 Hz) derived from a commercial power supply which supplies an electric power to the light source or the like, noise of the photodetector, and the like.

In an optical heterodyne interferometry (see Patent Documents 1 and 2), even when the noise is included in the intensity of the first light beam or the second light beam, the influence of the noise can be reduced, and the phase information can be obtained based on the detection signal output from the photodetector.

In the optical heterodyne interferometry, an optical frequency $\omega_1$ of the first light beam and an optical frequency $\omega_2$ of the second light beam are set to be slightly different from each other. The difference $\omega_h$ ($=\omega_2-\omega_1$) of the optical frequencies is called a heterodyne frequency, and is set to a value much lower than the optical frequency of each of the first light beam and the second light beam, and sufficiently lower than the band of the photodetector. When the intensity of the light obtained by combining and interfering the first light beam and the second light beam is detected by the photodetector, the detection signal $I(t)$ output from the photodetector has a component which temporally changes sinusoidally at the heterodyne frequency $\omega_h$.

An electric field $E_1(t)$ of the first light beam is represented by the following Formula (1), and an electric field $E_2(t)$ of the second light beam is represented by the following Formula (2). t is a time, and $\phi_1$ and $\phi_2$ are phases.

[Formula 1]

$$E_1(t) = e_1 \cdot \cos(\omega_1 t + \phi_1) \qquad (1)$$

[Formula 2]

-continued
$$E_2(t) = e_2 \cdot \cos(\omega_2 t + \phi_2) \qquad (2)$$

When the intensity of the light generated by the heterodyne interference by combining the first light beam and the second light beam is detected by the photodetector, the detection signal $I(t)$ output from the photodetector is represented by the following Formula (3).

[Formula 3]

$$I(t) = \frac{1}{T}\int_{t-T}^{t} (E_1(\tau) + E_2(\tau))^2 d\tau \qquad (3)$$
$$\simeq \frac{e_1^2}{2} + \frac{e_2^2}{2} + e_1 e_2 \cdot \cos(\omega_h t + \phi_2 - \phi_1)$$

In the above Formula 1/T corresponds to the band of the photodetector. A third term in the right side of the above Formula (3) temporally changes sinusoidally at the heterodyne frequency $\omega_h$. Even when the electric field amplitude $e_1$ of the first light beam or the electric field amplitude $e_2$ of the second light beam is unknown, it is possible to obtain the phase of the component (the third term of the right side) in the detection signal $I(t)$ which temporally changes sinusoidally at the heterodyne frequency $\omega_h$.

Further, when the noise is included in the electric field amplitude $e_1$ of the first light beam or the electric field amplitude $e_2$ of the second light beam, the heterodyne frequency is set to a frequency having a small noise intensity in a frequency spectrum of the noise, so that the influence of the noise can be reduced and the phase information can be obtained.

CITATION LIST

Patent Literature

Patent Document 1: Japanese Patent Application Laid-Open Publication No. H2-83428
Patent Document 2: Japanese Patent Application Laid-Open Publication No. 2010-210541

SUMMARY OF INVENTION

Technical Problem

In the process of performing research and development on the measurement technique using the optical heterodyne interferometry, the present inventors have found that the effect of reduction of the influence of the noise is not sufficient even when the heterodyne frequency is set to the frequency at which the noise intensity is small in the frequency spectrum of the noise. Further, the present inventors have found that, conversely, even when the heterodyne frequency is set to the frequency at which the noise intensity is large in the frequency spectrum of the noise, the effect of reduction of the influence of the noise is sufficiently obtained when a certain condition is satisfied.

An object of an embodiment is to provide an optical heterodyne interference measurement apparatus and an optical heterodyne interference measurement method capable of reducing influence of noise.

Solution to Problem

An embodiment of a first aspect is an optical heterodyne interference measurement apparatus. The optical heterodyne interference measurement apparatus includes (1) a beam generation unit for generating and outputting a first light beam and a second light beam having optical frequencies different from each other by a heterodyne frequency and polarizations orthogonal to each other; (2) a first photodetector for detecting a temporal change of an intensity generated by heterodyne interference between the first light beam and the second light beam after any one or both of the first light beam and the second light beam are reflected by or transmitted through a measurement object, and outputting a first detection signal; (3) a setting unit for setting, when $\omega_p$ is set to any peak frequency being temporally constant in a frequency spectrum of intensity noise included in the first light beam or the second light beam output from the beam generation unit, the heterodyne frequency being a difference between the optical frequencies of the first light beam and the second light beam output from the beam generation unit to a value of a rational multiple of the peak frequency $\omega_p$; and (4) an operation unit for acquiring information on the measurement object based on a phase of a component temporally changing sinusoidally at the heterodyne frequency in the first detection signal.

An embodiment of a second aspect is an optical heterodyne interference measurement apparatus. The optical heterodyne interference measurement apparatus includes (1) a beam generation unit for generating and outputting a first light beam and a second light beam having optical frequencies different from each other by a heterodyne frequency and polarizations orthogonal to each other based on light reflected by or transmitted through a measurement object; (2) a first photodetector for detecting a temporal change of an intensity generated by heterodyne interference between the first light beam and the second light beam, and outputting a first detection signal; (3) a setting unit for setting, when $\omega_p$ is set to any peak frequency being temporally constant in a frequency spectrum of intensity noise included in the first light beam or the second light beam output from the beam generation unit, the heterodyne frequency being a difference between the optical frequencies of the first light beam and the second light beam output from the beam generation unit to a value of a rational multiple of the peak frequency $\omega_p$; and (4) an operation unit for acquiring information on the measurement object based on a phase of a component temporally changing sinusoidally at the heterodyne frequency in the first detection signal.

An embodiment of a first aspect is an optical heterodyne interference measurement method. The optical heterodyne interference measurement method includes (1) a beam generation step of generating and outputting a first light beam and a second light beam having optical frequencies different from each other by a heterodyne frequency and polarizations orthogonal to each other; (2) a first photodetection step of detecting a temporal change of an intensity generated by heterodyne interference between the first light beam and the second light beam by a first photodetector after any one or both of the first light beam and the second light beam are reflected by or transmitted through a measurement object, and outputting a first detection signal; (3) a setting step of setting, when $\omega_p$ is set to any peak frequency being temporally constant in a frequency spectrum of intensity noise included in the first light beam or the second light beam output in the beam generation step, the heterodyne frequency being a difference between the optical frequencies of the first light beam and the second light beam output in the beam generation step to a value of a rational multiple of the peak frequency $\omega_p$; and (4) an operation step of acquiring information on the measurement object based on a phase of a component temporally changing sinusoidally at the heterodyne frequency in the first detection signal.

An embodiment of a second aspect is an optical heterodyne interference measurement method. The optical heterodyne interference measurement method includes (1) a beam generation step of generating and outputting a first light beam and a second light beam having optical frequencies different from each other by a heterodyne frequency and polarizations orthogonal to each other based on light reflected by or transmitted through a measurement object; (2) a first photodetection step of detecting a temporal change of an intensity generated by heterodyne interference between the first light beam and the second light beam by a first photodetector, and outputting a first detection signal; (3) a setting step of setting, when $\omega_p$ is set to any peak frequency being temporally constant in a frequency spectrum of intensity noise included in the first light beam or the second light beam output in the beam generation step, the heterodyne frequency being a difference between the optical frequencies of the first light beam and the second light beam output in the beam generation step to a value of a rational multiple of the peak frequency $\omega_p$; and (4) an operation step of acquiring information on the measurement object based on a phase of a component temporally changing sinusoidally at the heterodyne frequency in the first detection signal.

Advantageous Effects of Invention

According to the optical heterodyne interference measurement apparatus and the optical heterodyne interference measurement method of the embodiments, it is possible to reduce the influence of noise in a measurement using the optical heterodyne interferometry.

of the heterodyne frequency 80 Hz, and a sinusoidal wave representing the temporal change of the intensity of noise of the peak frequency 60 Hz.

Figure 9:
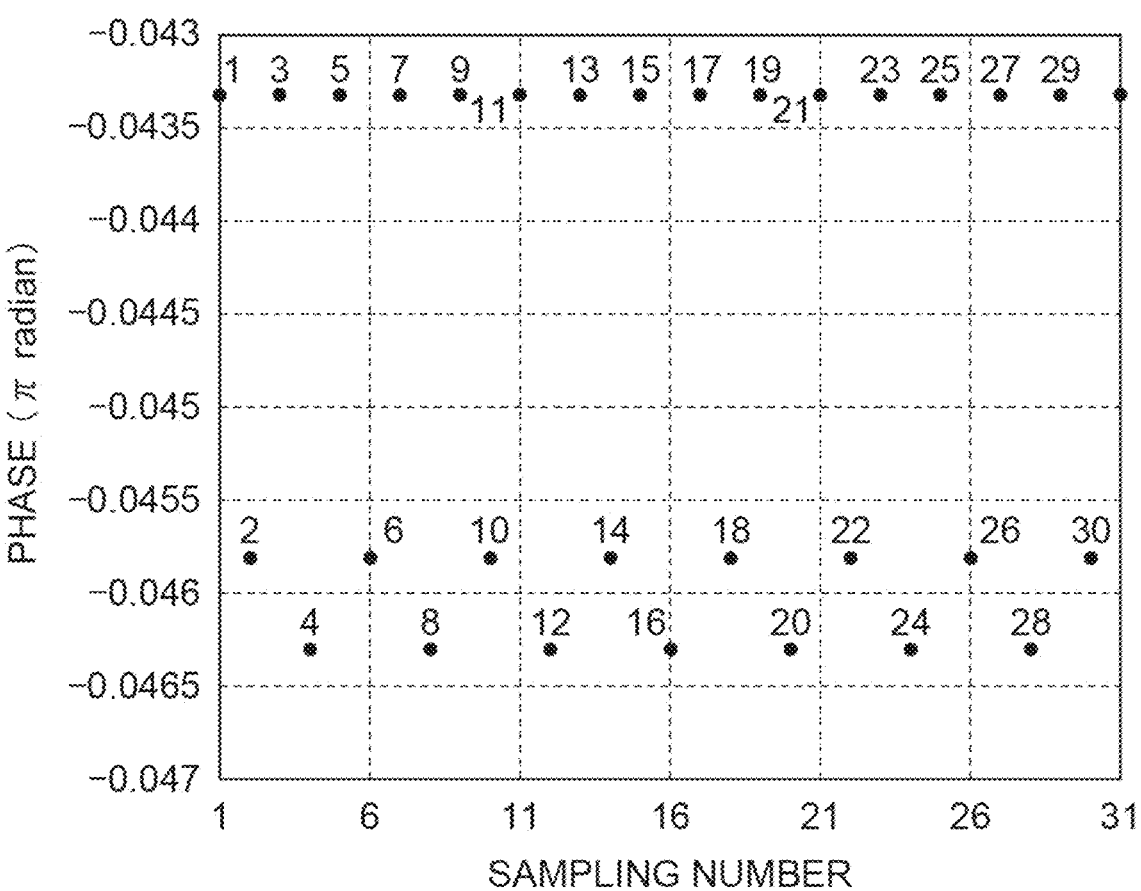

FIG. 9 is a diagram illustrating a relationship between a sampling number for each period of the heterodyne signal of 80 Hz and a phase being obtained.

Figure 10:
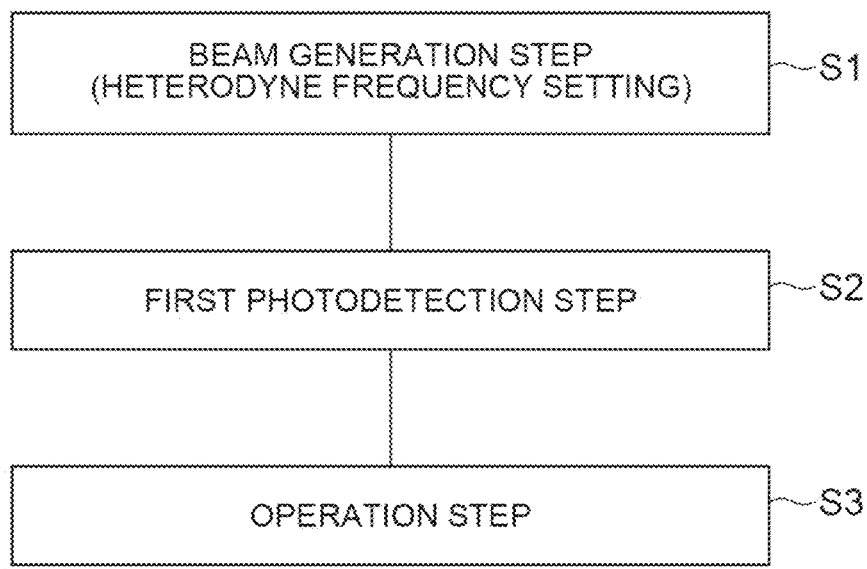

FIG. 10 is a flowchart of an optical heterodyne interference measurement method.

DESCRIPTION OF EMBODIMENTS

Hereinafter, embodiments of an optical heterodyne interference measurement apparatus and an optical heterodyne interference measurement method will be described in detail with reference to the accompanying drawings. In the description of the drawings, the same elements will be denoted by the same reference signs, and redundant description will be omitted. The present invention is not limited to these examples.

First, an entire configuration of an heterodyne interference measurement apparatus and an heterodyne interference measurement method will be described, and then, a main part of the configuration will be described.

Figure 1:
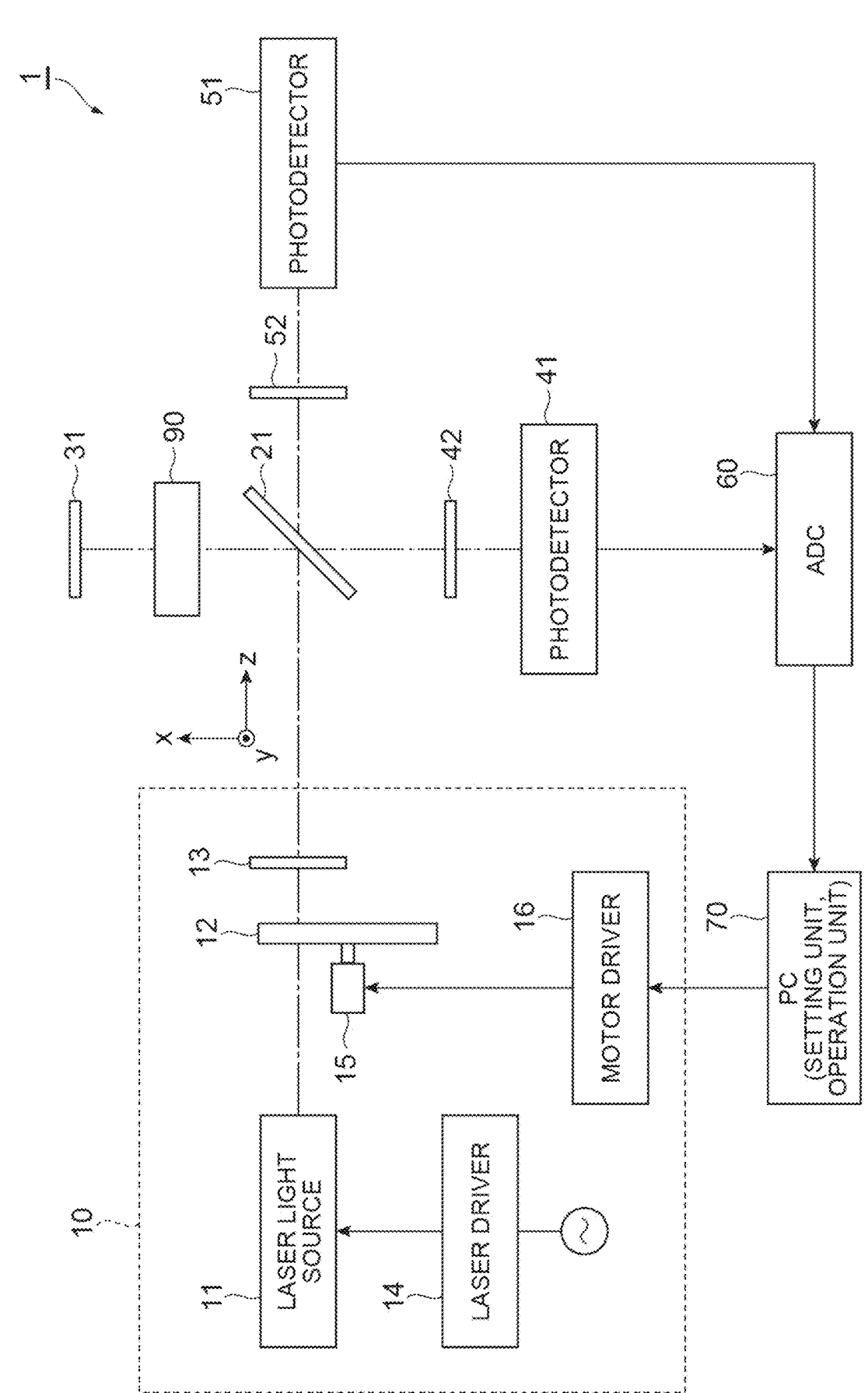
FIG. 1 is a diagram illustrating a configuration of an optical heterodyne interference measurement apparatus 1.

FIG. 1 is a diagram illustrating a configuration of an optical heterodyne interference measurement apparatus 1. The optical heterodyne interference measurement apparatus 1 includes a beam generation unit 10, a beam splitter 21, a mirror 31, a first photodetector 41, a linear polarizer 42, a second photodetector 51, a linear polarizer 52, an AD conversion unit 60, and a computer 70. The optical heterodyne interference measurement apparatus 1 can measure a retardation of a measurement object 90 being placed on an optical path between the beam splitter 21 and the mirror 31.

The beam generation unit 10 generates and outputs a first light beam and a second light beam having polarizations being orthogonal to each other (a beam generation step). The first light beam and the second light beam have optical frequencies being different from each other by a heterodyne frequency. The beam generation unit 10 includes a laser light source 11, a half wave plate 12, a quarter wave plate 13, a laser driver 14, a motor 15, and a motor driver 16.

In addition, "the polarizations are orthogonal to each other" means that, when each polarization state is represented by a Jones vector, these are orthogonal as complex vectors. Examples of the polarization states orthogonal to each other include a combination of an x polarization and a y polarization, and a combination of a right-handed circular polarization and a left-handed circular polarization, and more generally, may include a combination of two elliptical polarizations.

As illustrated in the diagram, an xyz orthogonal coordinate system is set for convenience of explanation. The z axis is a direction parallel to the traveling direction of the light. The x axis is a direction parallel to the plane of paper and perpendicular to the traveling direction of the light. The y axis is a direction perpendicular to the plane of paper.

The laser light source 11 is driven by the laser driver 14, and outputs laser light. The laser light output from the laser light source 11 has a linear polarization. For example, the laser light output from the laser light source 11 has the linear polarization parallel to the x axis direction. As the laser light source 11, an arbitrary one can be used, and for example, a He—Ne laser light source is used.

The laser driver 14 is electrically coupled to the laser light source 11, and causes the laser light source 11 to perform laser oscillation. An electric power with a frequency of 60

Hz and an AC voltage of 100 V is supplied to the laser driver 14 from a commercial power supply.

The half wave plate 12 is optically coupled to the laser light source 11. The half wave plate 12 has a flat plate shape, and is fixed perpendicular to a rotation shaft of the motor 15. The half wave plate 12 rotates at a constant speed w with the rotation of the rotation shaft of the motor 15. The motor driver 16 is electrically coupled to the motor 15, and drives the motor 15 to rotate the half wave plate 12 at the constant speed w in response to an instruction from the computer 70.

The laser light output from the laser light source 11 passes through the half wave plate 12 rotating at the constant speed w, and is converted into superposition of two light components (a right-handed circular polarization component and a left-handed circular polarization component) having optical frequencies different from each other. Respective intensities of the right-handed circular polarization component and the left-handed circular polarization component output from the half wave plate 12 may be equal to each other, or may not be equal to each other.

The respective optical frequencies of the right-handed circular polarization component and the left-handed circular polarization component are optical frequencies changed by ±2w with respect to the optical frequency of the laser light being output from the laser light source 11. That is, a difference between the respective optical frequencies of the right-handed circular polarization component and the left-handed circular polarization component is four times the rotation speed w of the half wave plate 12.

The quarter wave plate 13 is optically coupled to the half wave plate 12. A fast axis of the quarter wave plate 13 is set to be on the xy plane and inclined by a predetermined angle (for example, 45°) with respect to the x axis direction. In addition, the right-handed circular polarization component and the left-handed circular polarization component being output from the half wave plate 12 become an x polarization component and a y polarization component by passing through the quarter wave plate 13. Respective intensities of the x polarization component and the y polarization component output from the quarter wave plate 13 may be equal to each other, or may not be equal to each other.

The respective optical frequencies of the x polarization component and the y polarization component are optical frequencies changed by ±2w with respect to the optical frequency of the laser light being output from the laser light source 11. That is, a difference (a heterodyne frequency) between the respective optical frequencies of the x polarization component and the y polarization component is 4w.

The beam generation unit 10 outputs one of the x polarization component light and the y polarization component light output from the quarter wave plate 13 as the first light beam, and outputs the other as the second light beam. The first light beam and the second light beam have the polarizations being orthogonal to each other, and have the optical frequencies being different from each other by the heterodyne frequency 4w.

Further, the half wave plate 12 rotating at the constant speed and the quarter wave plate 13 constitute a frequency shifter for generating and outputting the first light beam and the second light beam having the optical frequencies different from each other and the polarizations orthogonal to each other, based on the laser light output from the laser light source 11.

The beam splitter 21 is optically coupled to the beam generation unit 10. The beam splitter 21 collectively splits the first light beam and the second light beam output from the beam generation unit 10 into two light beams at a predetermined intensity ratio, and outputs the two light beams as first split light and second split light (a splitting step).

The beam splitter 21 is, for example, a half mirror which splits the light at the intensity ratio of 1:1. Further, the beam splitter 21 may have polarization dependency. Therefore, each of the first split light and the second split light output from the beam splitter 21 includes the first light beam and the second light beam having the polarizations orthogonal to each other at the predetermined intensity ratio (for example, the intensity ratio of 1:1). The beam splitter 21 outputs the reflected first split light to the mirror 31, and outputs the transmitted second split light to the linear polarizer 52.

The mirror 31 is optically coupled to the beam splitter 21. The mirror 31 inputs the first split light output from the beam splitter 21 and passed through the measurement object 90, and perpendicularly reflects the first split light. The first split light reflected by the mirror 31 passes through the measurement object 90 again, and subsequently, the first split light transmitted through the beam splitter 21 is input to the linear polarizer 42.

The first split light being passed through the measurement object 90 twice has information on the retardation of the measurement object 90 as phase information. The first light beam and the second light beam included in the first split light are the x polarization component and the y polarization component having the optical frequencies different from each other by the heterodyne frequency 4w. By making a fast axis of the measurement object 90 coincide with the x axis direction or the y axis direction, the first light beam and the second light beam included in the first split light are subject to different phase changes according to birefringence (a property in which a refractive index is different depending on a polarization direction) of the measurement object 90.

In addition, in the case where the retardation information of the measurement object 90 is unknown or the like, the retardation may be measured while rotating the measurement object 90, and the fast axis of the measurement object 90 may be matched with the x axis direction or the y axis direction based on an angle at which the retardation becomes an extreme value.

The linear polarizer 42 is optically coupled to the beam splitter 21. A transmission axis of the linear polarizer 42 is set to be on the xy plane and inclined by a predetermined angle (for example, 45°) with respect to the x axis direction.

The linear polarizer 42 inputs the first split light arriving from the beam splitter 21, mixes the first light beam and the second light beam (the x polarization component and the y polarization component) included in the first split light at a predetermined intensity ratio (for example, an intensity ratio of 1:1), converts the light into light having a single linear polarization component, and outputs the light. In this case, the first light beam and the second light beam may be mixed such that an amplitude of a sinusoidal wave included in the heterodyne signal becomes the largest.

The first photodetector 41 is optically coupled to the linear polarizer 42. The first photodetector 41 receives the light output from the linear polarizer 42, detects a temporal change of the light intensity, and outputs a first detection signal (a first photodetection step).

The first detection signal represents the temporal change of the intensity generated by the heterodyne interference between the first light beam and the second light beam (the x polarization component and the y polarization component) included in the first split light, and includes a component temporally changing sinusoidally at the heterodyne frequency 4w. The first detection signal is a measurement signal having the retardation information of the measurement object 90 as the phase information.

The linear polarizer 52 is optically coupled to the beam splitter 21. A transmission axis of the linear polarizer 52 is set to be on the xy plane and inclined by a predetermined angle (for example, 45°) with respect to the x axis direction.

The linear polarizer 52 inputs the second split light arriving from the beam splitter 21, mixes the first light beam and the second light beam (the x polarization component and the y polarization component) included in the second split light at a predetermined intensity ratio (for example, an intensity ratio of 1:1), converts the light into light having a single linear polarization component, and outputs the light. In this case, the first light beam and the second light beam may be mixed such that an amplitude of a sinusoidal wave included in the heterodyne signal becomes the largest.

The second photodetector 51 is optically coupled to the linear polarizer 52. The second photodetector 51 receives the light output from the linear polarizer 52, detects a temporal change of the light intensity, and outputs a second detection signal (a second photodetection step).

The second detection signal represents the temporal change of the intensity generated by the heterodyne interference between the first light beam and the second light beam (the x polarization component and the y polarization component) included in the second split light, and includes a component temporally changing sinusoidally at the heterodyne frequency 4w. The second detection signal is a reference signal which does not have the retardation information of the measurement object 90 as the phase information.

The AD conversion unit 60 is electrically coupled to the first photodetector 41 and the second photodetector 51. The AD conversion unit 60 can perform sampling of data of an analog signal at a rate sufficiently faster than the heterodyne frequency 4w, and convert the data into data of a digital signal. For example, the sampling rate of the AD conversion unit 60 may be a rate which is twice or more the heterodyne frequency 4w, and further, may be a rate which is ten times or more the heterodyne frequency.

The AD conversion unit 60 input the first detection signal (the measurement signal) output from the first photodetector 41 as an analog signal, converts the analog signal into a digital signal, and outputs the digital signal. Further, the AD conversion unit 60 inputs the second detection signal (the reference signal) output from the second photodetector 51 as an analog signal, converts the analog signal into a digital signal, and outputs the digital signal.

The computer 70 is electrically coupled to the AD conversion unit 60. The computer 70 has functions of both a setting unit and an operation unit as described below. The computer 70 as the setting unit sets the heterodyne frequency 4w to a desired value, and instructs the motor driver 16 to cause the motor 15 to rotate the half wave plate 12 at the constant speed w (a setting step). The setting of the heterodyne frequency 4w will be described in detail later.

The computer 70 as the operation unit inputs the first detection signal (the measurement signal) and the second detection signal (the reference signal) output as the digital signals from the AD conversion unit 60, obtains a phase of a component temporally changing sinusoidally at the heterodyne frequency 4w in each of the signals, and obtains a phase difference (retardation) $\Delta\phi$ of the measurement object 90 based on the phases (an operation step).

In addition, the computer 70 can obtain $\Delta$n (a difference between a refractive index for the x polarization and a refractive index for the y polarization) which is an index of birefringence from the following Formula (4) based on the phase difference $\Delta\phi$. d is a thickness of the measurement object 90 in a light passing direction, and $\lambda$ is a wavelength of the light. This Formula takes into account the fact that the first split light passed through the measurement object 90 twice.

[Formula 4]

$$\Delta\phi = \frac{2 \cdot 2\pi d \cdot \Delta n}{\lambda} \qquad (4)$$

Figure 2:
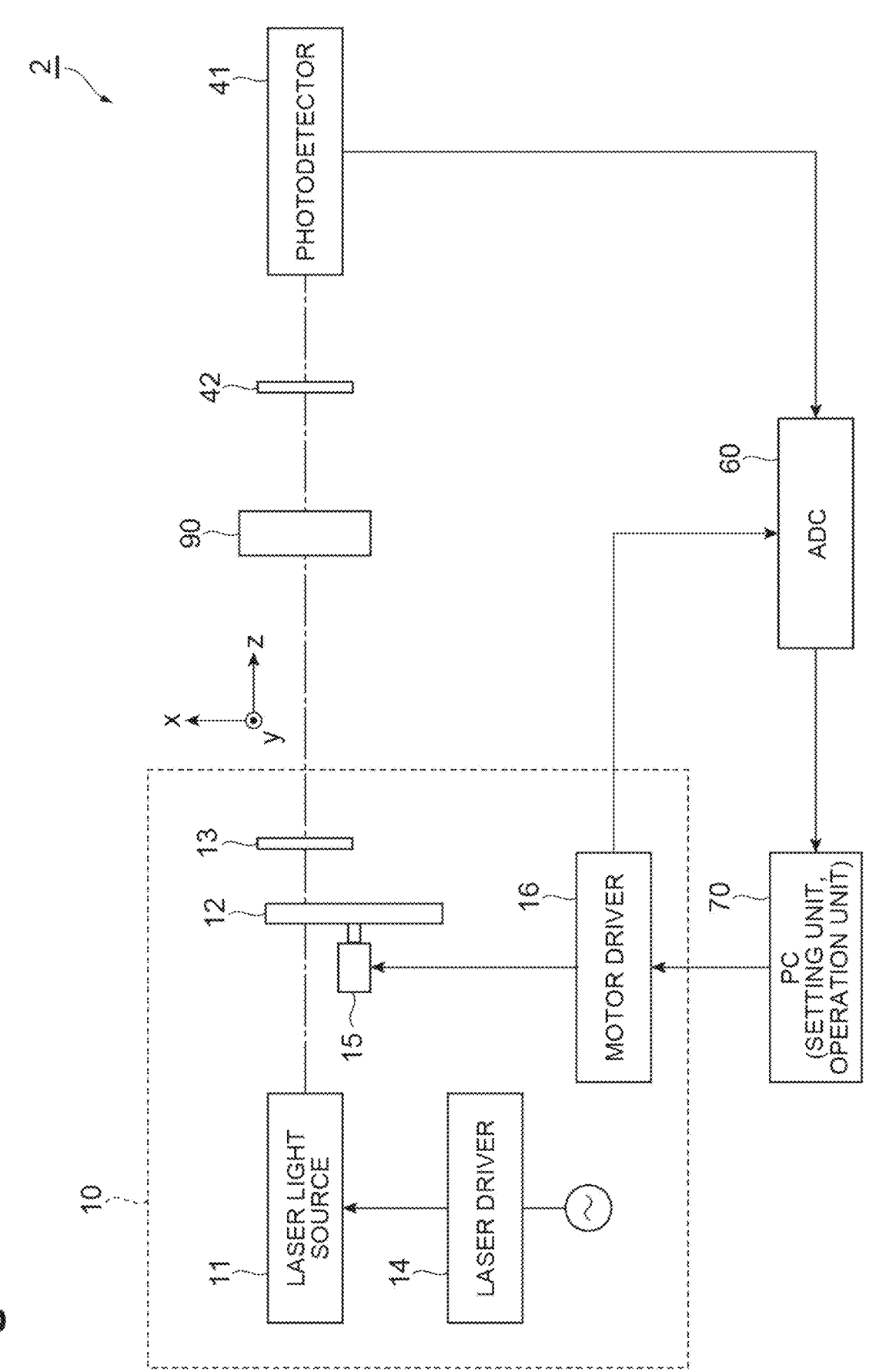
FIG. 2 is a diagram illustrating a configuration of an optical heterodyne interference measurement apparatus 2.

FIG. 2 is a diagram illustrating a configuration of an optical heterodyne interference measurement apparatus 2. The optical heterodyne interference measurement apparatus 2 includes the beam generation unit 10, the first photodetector 41, the linear polarizer 42, the AD conversion unit 60, and the computer 70. The optical heterodyne interference measurement apparatus 2 can measure the retardation of the measurement object 90 placed on an optical path between the beam generation unit 10 and the linear polarizer 42.

In this configuration, the first light beam and the second light beam (the x polarization component and the y polarization component) output from the beam generation unit 10 pass through the measurement object 90, and are input to the linear polarizer 42. The transmission axis of the linear polarizer 42 is set to be on the xy plane and inclined by the predetermined angle (for example, 45°) with respect to the x axis direction.

The linear polarizer 42 inputs the first light beam and the second light beam passed through the measurement object 90, mixes the first light beam and the second light beam (the x polarization component and the y polarization component) at the predetermined intensity ratio (for example, the intensity ratio of 1:1), converts the light into the light having the single linear polarization component, and outputs the light. In this case, the first light beam and the second light beam may be mixed such that the amplitude of the sinusoidal wave included in the heterodyne signal becomes the largest.

The first photodetector 41 receives the light output from the linear polarizer 42, detects the temporal change of the light intensity, and outputs the first detection signal. The first detection signal represents the temporal change of the intensity generated by the heterodyne interference between the first light beam and the second light beam (the x polarization component and the y polarization component), and includes the component temporally changing sinusoidally at the heterodyne frequency 4w. The first detection signal is the measurement signal having the retardation information of the measurement object 90 as the phase information.

The AD conversion unit 60 inputs the first detection signal (the measurement signal) output from the first photodetector 41 as the analog signal, converts the analog signal into the digital signal, and outputs the digital signal. Further, the AD conversion unit 60 inputs an electric signal (a reference signal) temporally changing at the heterodyne frequency 4w output from the motor driver 16 of the beam generation unit 10 as an analog signal, converts the analog signal into a digital signal, and outputs the digital signal. In addition, the reference signal output from the motor driver 16 may not be a sinusoidal wave.

The signal output from the motor driver 16 serves as an aid for outputting the timing of the frequency 4w. A waveform which oscillates at a frequency 2w (not limited to a sinusoidal wave) is output from the motor driver 16, a threshold value is provided for each of a rising edge and a falling edge of the waveform, and the timing at which it exceeds the threshold value can be used as a reference of a phase. Further, a waveform which oscillates at a frequency w may be output from the motor driver 16, and the timing of the frequency 4w may be determined based on the waveform at the time of the analysis by the computer.

The computer 70 as the operation unit inputs the first detection signal (the measurement signal) and the second detection signal (the reference signal) output as the digital signals from the AD conversion unit 60, obtains the phase of the component temporally changing sinusoidally at the heterodyne frequency 4w in each of the signals, and obtains the phase difference (retardation) $\Delta\phi$ of the measurement object 90 based on the phases (the operation step). In addition, the computer 70 can obtain $\Delta n$ (the difference between the refractive index for the x polarization and the refractive index for the y polarization) which is the index of birefringence based on the phase difference $\Delta\phi$.

As compared with the configuration illustrated in FIG. 1, in the configuration illustrated in FIG. 2, the beam splitter 21, the mirror 31, the second photodetector 51, and the linear polarizer 52 are not necessary, and thus, the optical system becomes simple, so that alignment of the optical system is easy. In addition, in each of the configurations of FIG. 1 and FIG. 2, the reference signal may be omitted, and the phase difference $\Delta\phi$ of the measurement object 90 can be obtained only from the measurement signal. In this case, for example, calibration may be performed in a state in which the measurement object 90 is not disposed.

Figure 3:
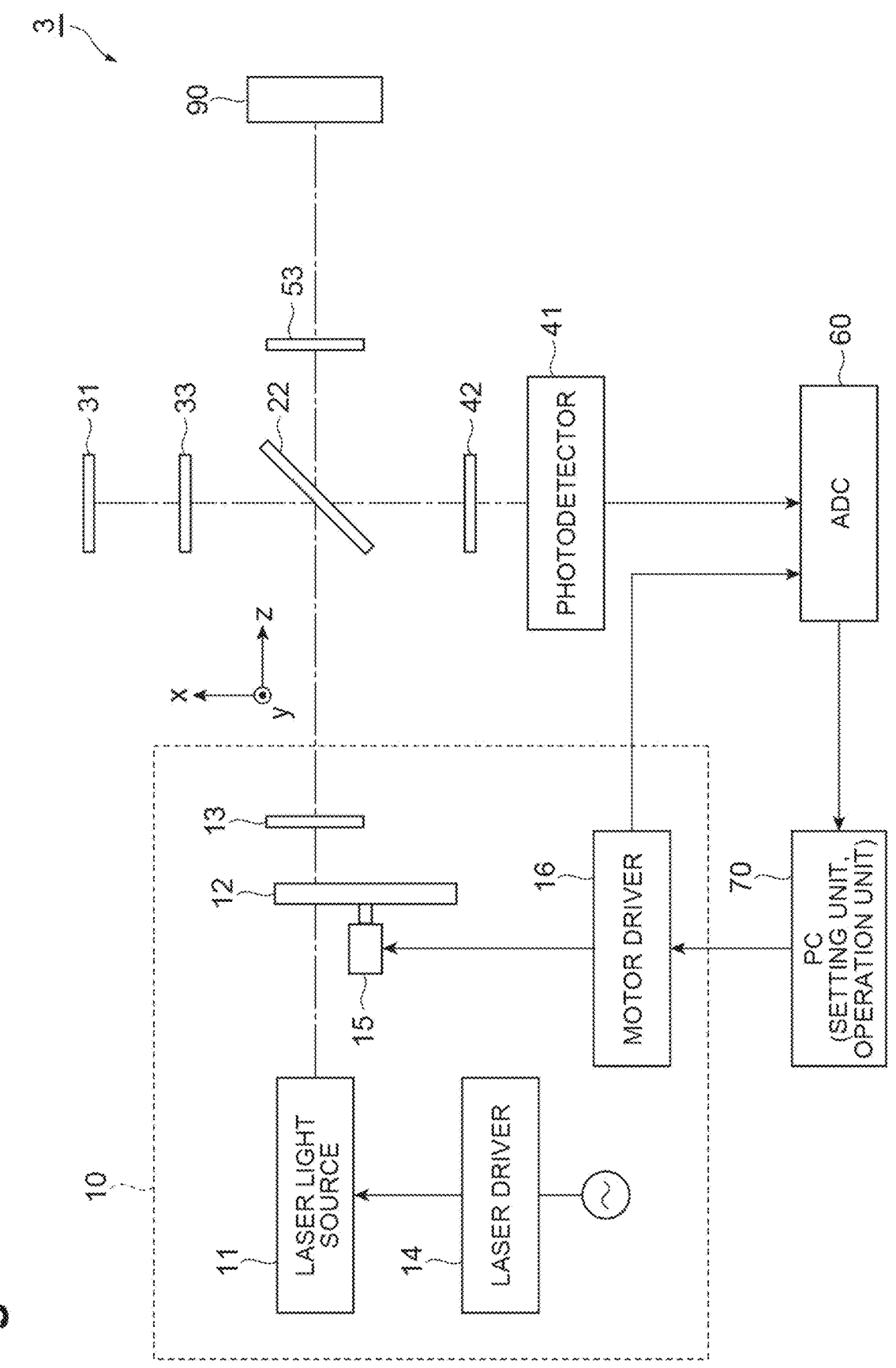
FIG. 3 is a diagram illustrating a configuration of an optical heterodyne interference measurement apparatus 3.

FIG. 3 is a diagram illustrating a configuration of an optical heterodyne interference measurement apparatus 3. The optical heterodyne interference measurement apparatus 3 includes the beam generation unit 10, a polarizing beam splitter 22, the mirror 31, a quarter wave plate 33, the first photodetector 41, the linear polarizer 42, a quarter wave plate 53, the AD conversion unit 60, and the computer 70. The optical heterodyne interference measurement apparatus 3 can measure a displacement of the measurement object 90.

In this configuration, the polarizing beam splitter 22 is optically coupled to the beam generation unit 10. The polarizing beam splitter 22, in the first light beam and the second light beam (the x polarization component and the y polarization component) output from the beam generation unit 10, transmits the first light beam (the x polarization component) and outputs the light beam to the quarter wave plate 53, and reflects the second light beam (the y polarization component) and outputs the light beam to the quarter wave plate 33.

The first light beam transmitted and output through the polarizing beam splitter 22 passes through the quarter wave plate 53, and then, is reflected by the measurement object 90, passes through the quarter wave plate 53 again, and is input to the polarizing beam splitter 22. A fast axis of the quarter wave plate 53 is set to be on the xy plane and inclined by 45° with respect to the x axis direction. The first light beam passes through the quarter wave plate 53 twice to be converted from the x polarization component into the y polarization component, and thus, the light beam is reflected by the polarizing beam splitter 22 and output to the linear polarizer 42.

The second light beam reflected and output from the polarizing beam splitter 22 passes through the quarter wave plate 33, and then, is reflected by the mirror 31, passes through the quarter wave plate 33 again, and is input to the polarizing beam splitter 22. A fast axis of the quarter wave plate 33 is set to be on the xy plane and inclined by 45° with respect to the x axis direction. The second light beam passes through the quarter wave plate 33 twice to be converted from the y polarization component into the x polarization component, and thus, the light beam is transmitted through the polarizing beam splitter 22 and output to the linear polarizer 42.

The linear polarizer 42 is optically coupled to the polarizing beam splitter 22. The transmission axis of the linear polarizer 42 is set to be on the xy plane and inclined by the predetermined angle (for example, 45°) with respect to the x axis direction.

The linear polarizer 42 inputs the first light beam (the y polarization component) and the second light beam (the x polarization component) arriving from the polarizing beam splitter 22, mixes the first light beam and the second light beam (the y polarization component and the x polarization component) at the predetermined intensity ratio (for example, the intensity ratio of 1:1), converts the light into the light having the single linear polarization component, and outputs the light. In this case, the first light beam and the second light beam may be mixed such that the amplitude of the sinusoidal wave included in the heterodyne signal becomes the largest.

The first photodetector 41 receives the light output from the linear polarizer 42, detects the temporal change of the light intensity, and outputs the first detection signal. The first detection signal represents the temporal change of the intensity generated by the heterodyne interference between the first light beam and the second light beam (the y polarization component and the x polarization component), and includes the component temporally changing sinusoidally at the heterodyne frequency 4w. The first detection signal is the measurement signal having a difference between respective optical path lengths of the first light beam and the second light beam (that is, displacement information of the measurement object 90) as the phase information.

The AD conversion unit 60 inputs the first detection signal (the measurement signal) output from the first photodetector 41 as the analog signal, converts the analog signal into the digital signal, and outputs the digital signal. Further, the AD conversion unit 60 inputs the electric signal (the reference signal) temporally changing at the heterodyne frequency 4w output from the motor driver 16 of the beam generation unit 10 as the analog signal, converts the analog signal into the digital signal, and outputs the digital signal. In addition, the reference signal output from the motor driver 16 may not be the sinusoidal wave. Further, the reference signal may be omitted, and the displacement of the measurement object 90 can be obtained only from the measurement signal.

The computer 70 as the operation unit inputs the first detection signal (the measurement signal) and the second detection signal (the reference signal) output as the digital signals from the AD conversion unit 60, obtains the phase of the component temporally changing sinusoidally at the heterodyne frequency 4w in each of the signals, and obtains the displacement of the measurement object 90 based on the phases (the operation step).

As the configuration of the optical heterodyne interference measurement apparatus, various configurations can be used, in addition to the configurations of the optical heterodyne interference measurement apparatuses 1 to 3 illustrated in FIG. 1 to FIG. 3.

For example, the frequency shifter for generating and outputting the first light beam and the second light beam having the optical frequencies different from each other based on the laser light output from the light source may have a configuration including only the half wave plate 12 and not including the quarter wave plate 13, in addition to the configuration including the half wave plate 12 and the quarter wave plate 13 illustrated in FIG. 1 to FIG. 3.

The frequency shifter of the latter configuration can generate and output light in which the right-handed circular polarization component and the left-handed circular polarization component having the optical frequencies different from each other are superposed as the first light beam and the second light beam. In addition, the polarization states of the right-handed circular polarization and the left-handed circular polarization are orthogonal to each other.

Other configurations of the frequency shifter include a configuration using an electro-optical modulation element or an acousto-optical modulation element, a configuration in which light is split into two light beams, one split light beam is reflected by a mirror moving at a constant speed, and then the two split light beams are combined, a configuration in which light is split into two light beams, one split light beam is diffracted by a radial diffraction grating rotating at a constant speed, and then the two split light beams are combined, and the like.

As the configuration of the beam generation unit for generating and outputting the first light beam and the second light beam having the polarizations orthogonal to each other, there are a configuration using a transverse Zeeman laser light source, a configuration which combines light beams having polarizations orthogonal to each other respectively output from two external cavity diode lasers, and the like, in addition to the configuration using the light source and the frequency shifter.

By using the optical heterodyne interferometry, it is possible to measure a retardation when light is transmitted through the measurement object (for example, a transmission type spatial light modulator, a crystal such as quartz, an oriented liquid crystal, a photoelastic material such as glass) (FIG. 1, FIG. 2), a retardation when light is reflected by the measurement object (for example, a reflection type spatial light modulator), a displacement of (a reflection surface of) the measurement object using reflection of light by the measurement object (FIG. 3), a change of an optical path length along a path through which light is transmitted through the measurement object, a refractive index change of the measurement object, a surface shape of the measurement object, a surface roughness of the measurement object, and the like.

The surface roughness or the surface shape of the measurement object can be acquired by measuring the displacement of the measurement object using the reflection of the light from the measurement object on the surface. Further, the refractive index change of the measurement object corresponds to the change of the optical path length in the state in which a physical distance is constant in the displacement of the measurement object using the reflection of the light from the measurement object. In addition, in the case of the retardation measurement, the measurement object may be disposed on an optical path between the light source and the frequency shifter.

Figure 4:
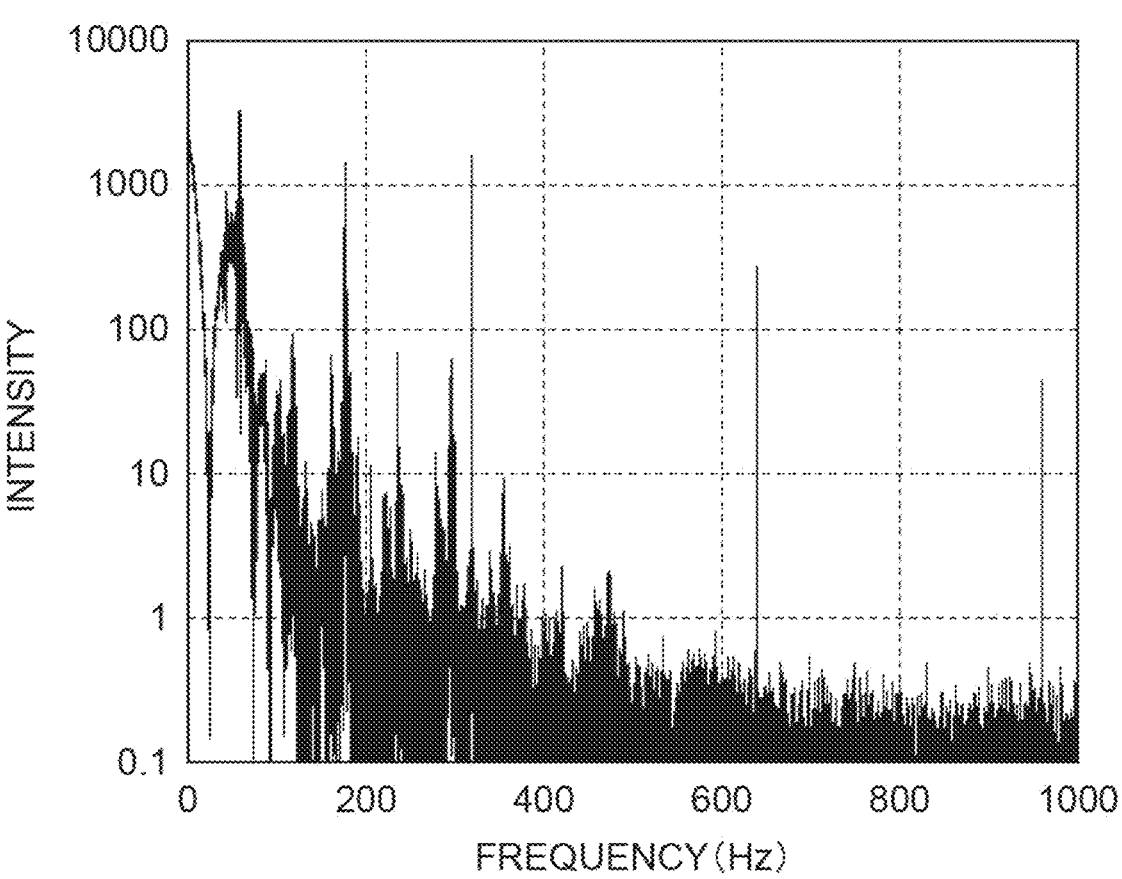
FIG. 4 is a diagram showing an example of a frequency spectrum of intensity noise included in laser light output from a He—Ne laser light source.

FIG. 4 is a diagram showing an example of the frequency spectrum of the intensity noise included in the laser light output from the He—Ne laser light source. As shown in this diagram, the intensity noise tends to decrease as the frequency increases as a whole, and on the other hand, there are peak frequencies at which the intensity noise is significantly larger than the intensity noise level in the vicinity. For example, a frequency 60 Hz of a commercial power supply, a frequency of an integer multiple of 60 Hz, a frequency 320 Hz, and a frequency of an integer multiple of 320 Hz are peak frequencies each having the intensity noise which is significantly larger compared to the intensity noise level in the vicinity.

In the configurations of the optical heterodyne interference measurement apparatuses 1 to 3 illustrated in FIG. 1 to FIG. 3, the peak frequency in the frequency spectrum of the intensity noise included in the first light beam or the second light beam output from the beam generation unit 10 coincides with the peak frequency in the frequency spectrum of the intensity noise included in the laser light output from the laser light source 11.

Figure 5:
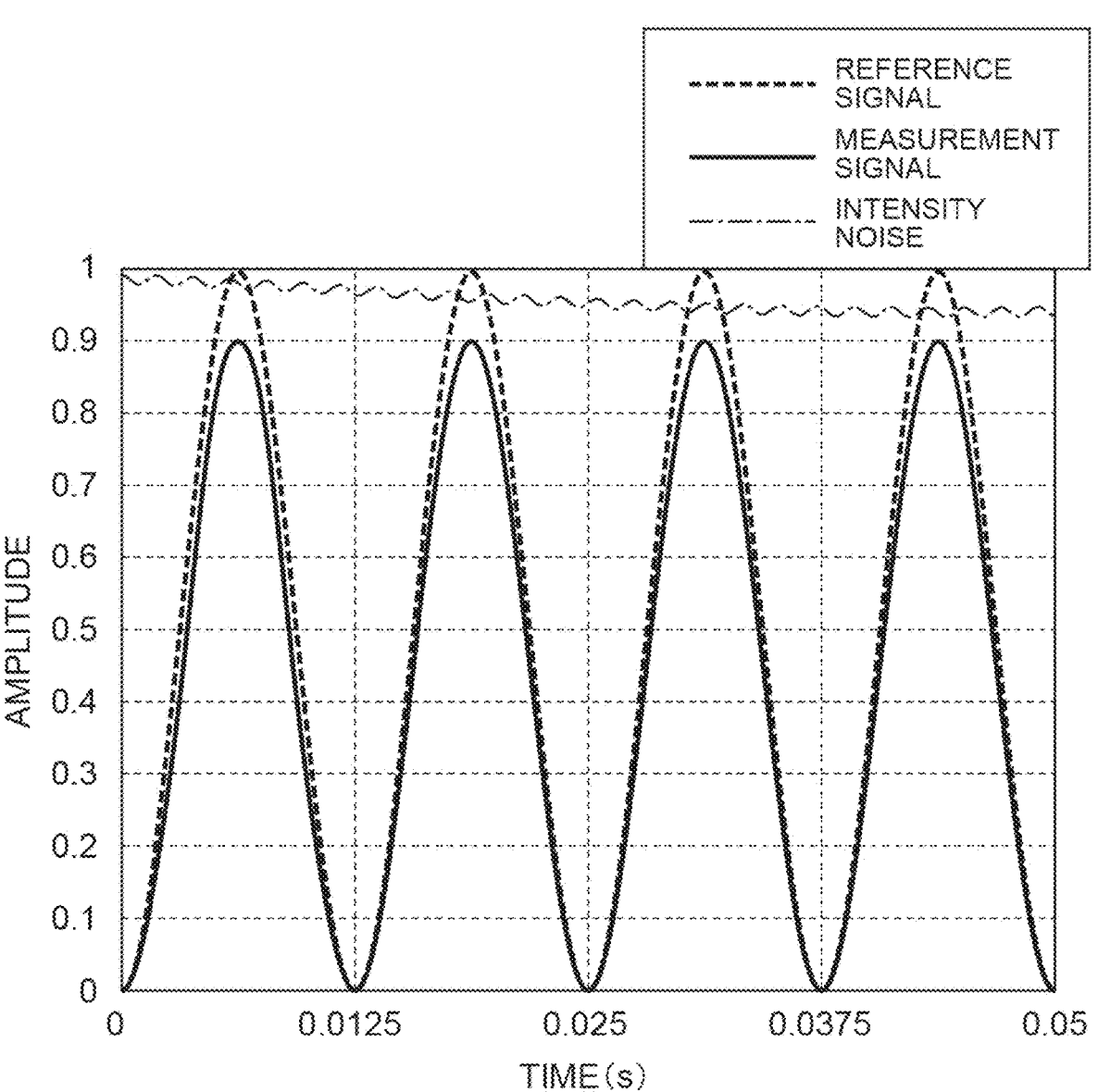
FIG. 5 is a diagram schematically illustrating a temporal change of an intensity of each of a reference signal and a measurement signal obtained by heterodyne interference in an ideal case in which output light from a laser light source does not include noise, and a temporal change of an output light intensity in a case in which the output light from the laser light source includes noise.

FIG. 5 is a diagram schematically illustrating the temporal change of the intensity of each of the reference signal and the measurement signal obtained by the heterodyne interference in an ideal case in which the output light from the laser light source does not include the noise, and the temporal change of the output light intensity in a case in which the output light from the laser light source includes the noise. The temporal change of the intensity of the output light from the laser light source is exaggeratedly illustrated. The temporal change of the intensity of each of the reference signal and the measurement signal in the ideal case has an ideal sinusoidal shape.

Figure 6:
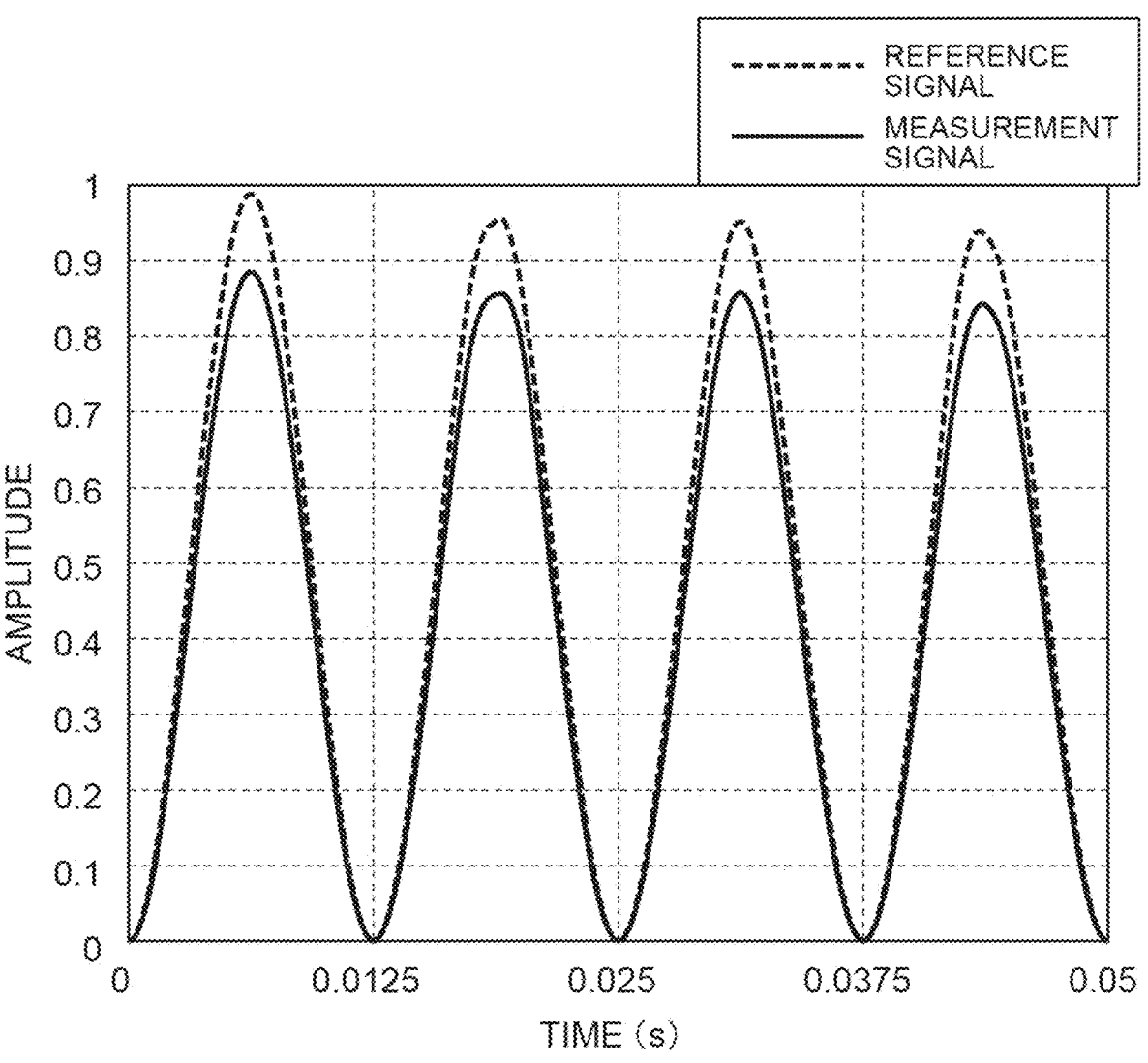
FIG. 6 is a diagram schematically illustrating the temporal change of the intensity of each of the reference signal and the measurement signal obtained by the heterodyne interference in the case in which the output light from the laser light source includes noise.

FIG. 6 is a diagram schematically illustrating the temporal change of the intensity of each of the reference signal and the measurement signal obtained by the heterodyne interference in the case in which the output light from the laser light source includes the noise as illustrated in FIG. 5.

As illustrated in this diagram, when the output light from the laser light source includes the noise, in general, the temporal change of the intensity of each of the reference signal and the measurement signal does not have an ideal sinusoidal shape, but has a distorted shape which is different in each peak. Specifically, the peak intensity of each of the reference signal and the measurement signal is different for each peak, or the shape around the peak of each of the reference signal and the measurement signal is asymmetric. In the above case, the phase cannot be accurately obtained based on the measurement signal and the reference signal.

Next, in the optical heterodyne interference measurement apparatus and the optical heterodyne interference measurement method, a method of setting the heterodyne frequency $\omega_h$ capable of reducing the influence of the noise by solving the above problem described with reference to FIG. 5 and FIG. 6 will be described.

FIG. 10 is a flowchart of the optical heterodyne interference measurement method. The optical heterodyne interference measurement method includes a beam generation step S1, a first photodetection step S2, and an operation step S3.

In the beam generation step S1, the first light beam and the second light beam having the optical frequencies different from each other by the heterodyne frequency and the polarizations orthogonal to each other are generated and output. Further, in the beam generation step S1, when the peak frequency being temporally constant in the frequency spectrum of the intensity noise included in the first light beam or the second light beam is set to $\omega_p$, the heterodyne frequency being the difference between the optical frequencies of the first light beam and the second light beam is set to a value of a rational multiple of the peak frequency $\omega_p$ (the setting step).

In the first photodetection step S2, the temporal change of the intensity generated by the heterodyne interference between the first light beam and the second light beam is detected by the first photodetector, and the first detection signal is output. In the operation step S3, the information on the measurement object is acquired based on the phase of the component temporally changing sinusoidally at the heterodyne frequency in the first detection signal. Hereinafter, the setting step will be described in detail.

In the setting step, the computer 70 as the setting unit sets the heterodyne frequency $\omega_h$ to a desired value, and instructs the beam generation unit 10 to generate and output the first light beam and the second light beam having the optical frequencies different from each other by the set heterodyne frequency $\omega_h$ and the polarizations orthogonal to each other.

Specifically, when $\omega_p$ is set to any peak frequency being temporally constant in the frequency spectrum of the intensity noise included in the first light beam or the second light beam output from the beam generation unit 10, the setting unit (the computer 70) sets the heterodyne frequency $\omega_h$ to the value of the rational multiple of the peak frequency $\omega_p$. In the frequency spectrum of the intensity noise shown in FIG. 4, the frequency 60 Hz of the commercial power supply, the frequency of the integer multiple of 60 Hz, the frequency 320 Hz, and the frequency of the integer multiple of 320 Hz are the peak frequencies being temporally constant.

Preferably, when a ratio $\omega_h/\omega_p$ between the heterodyne frequency $\omega_h$ and the peak frequency $\omega_p$ is represented by a rational number n/m (each of m and n is a positive integer which has only unity as a common divisor), the setting unit sets the heterodyne frequency $\omega_h$ in which n is set to 10 or less. More preferably, the setting unit sets the heterodyne frequency $\omega_h$ in which n=1. Most preferably, the setting unit sets the heterodyne frequency $\omega_h$ to the same value as the peak frequency $\omega_p$, with n=m=1.

Further, preferably, when the ratio $\omega_h/\omega_p$ between the heterodyne frequency $\omega_h$ and the peak frequency $\omega_p$ is represented by a rational number n/m (each of m and n is a positive integer which has only unity as a common divisor), the setting unit sets the heterodyne frequency $\omega_h$ in which m is set to 10 or less. More preferably, the setting unit sets the heterodyne frequency $\omega_h$ in which m=1. Most preferably, the setting unit sets the heterodyne frequency $\omega_h$ to the same value as the peak frequency $\omega_p$, with n=m=1.

Figure 7:
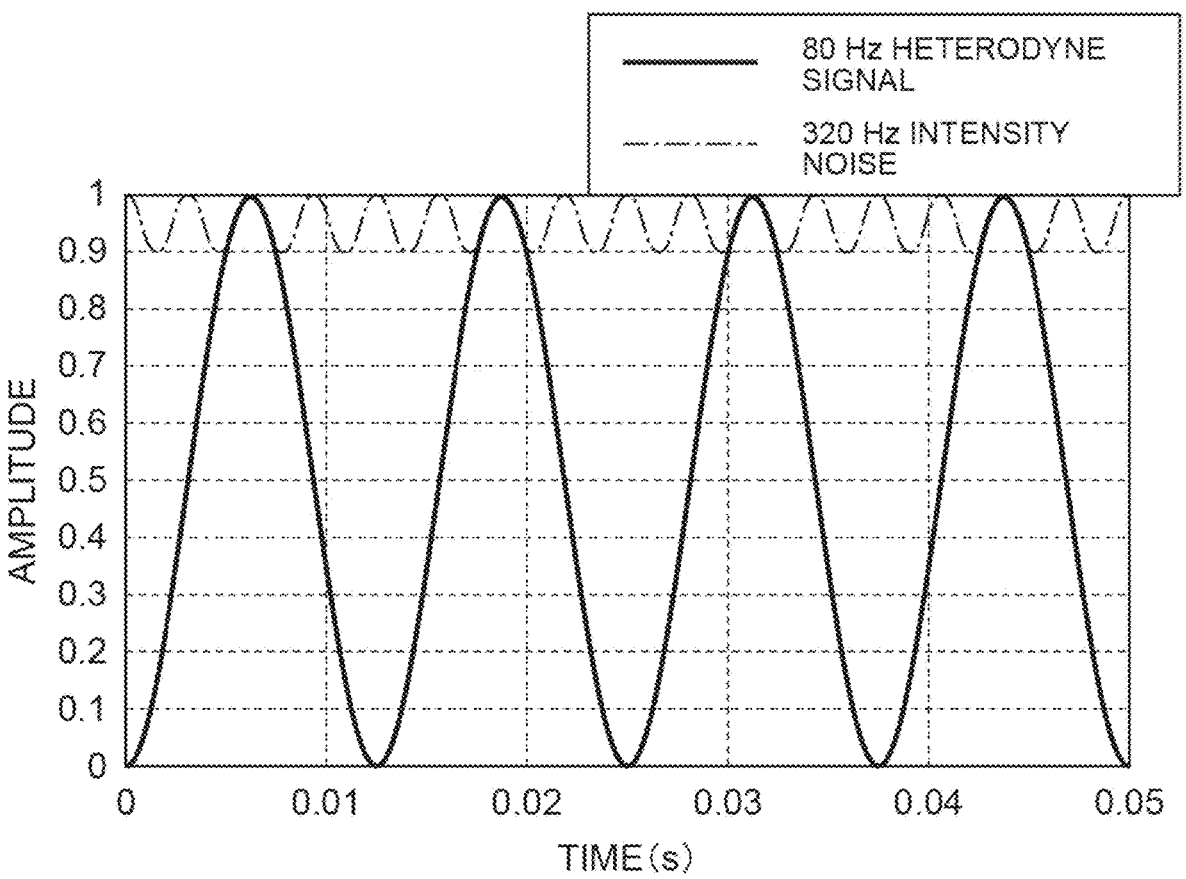
FIG. 7 is a diagram schematically illustrating a temporal change of an intensity of a heterodyne signal (the reference signal or the measurement signal) of a heterodyne frequency 80 Hz, and a temporal change of an intensity of noise of a peak frequency 320 Hz.

For example, the setting unit focuses on the intensity noise of the peak frequency 320 Hz, sets n=1 and m=4, and sets the heterodyne frequency to 80 Hz which is ¼ times the peak frequency. FIG. 7 is a diagram schematically illustrating the temporal change of the intensity of the heterodyne signal (the reference signal or the measurement signal) of the heterodyne frequency 80 Hz, and the temporal change of the intensity of the noise of the peak frequency 320 Hz. The temporal change of the intensity of the noise is exaggeratedly illustrated.

As illustrated in this diagram, the peak intensity of the heterodyne signal is consistent at each peak, and the shape around the peak of the heterodyne signal is also consistent at each peak. This means that the influence of the noise is reduced, and thus, the phase can be accurately acquired based on the measurement signal and the reference signal.

Figure 8:
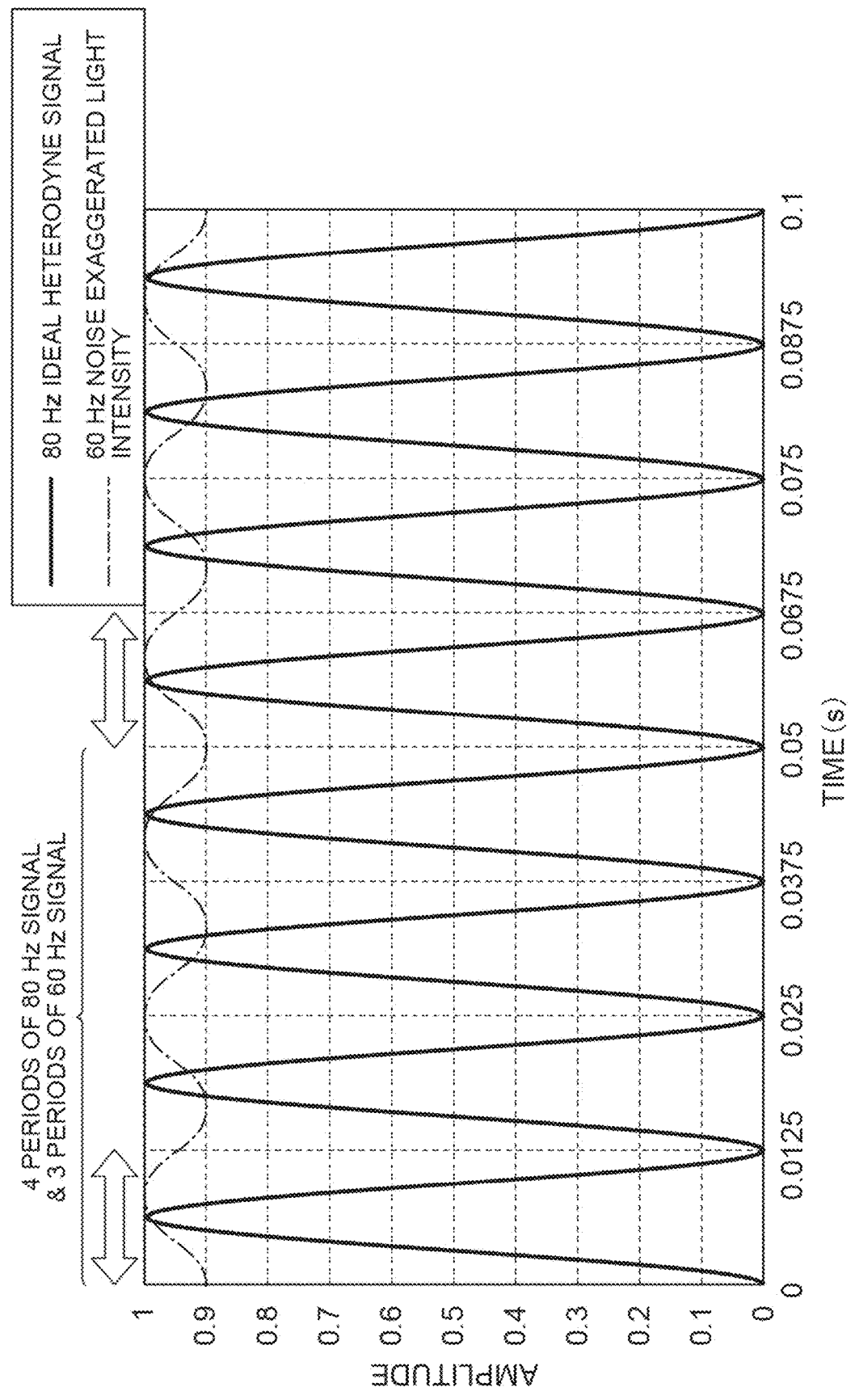
FIG. 8 is a diagram illustrating a sinusoidal wave representing the temporal change of the intensity of the heterodyne signal (the reference signal or the measurement signal)

Further, for example, the setting unit focuses on the intensity noise of the peak frequency 60 Hz, sets n=4 and m=3, and sets the heterodyne frequency to 80 Hz which is 4/3 times the peak frequency. FIG. 8 is a diagram illustrating the sinusoidal wave representing the temporal change of the intensity of the heterodyne signal (the reference signal or the measurement signal) of the heterodyne frequency 80 Hz, and the sinusoidal wave representing the temporal change of the intensity of the noise of the peak frequency 60 Hz.

As illustrated in this diagram, the time for n periods of the 80 Hz heterodyne signal is equal to the time for m periods of the 60 Hz intensity noise.

Therefore, when the n periods of the 80 Hz heterodyne signal are set to one set, the influence of the noise in the one set does not temporally change. The influence of the noise is similarly received in the next one set. FIG. 9 is a diagram illustrating a relationship between a sampling number for each period of the heterodyne signal of 80 Hz and the phase being obtained.

As illustrated in this diagram, although the phase obtained for each period in the one set of the 80 Hz heterodyne signal is different, it is not necessary to take the average of the phases for the n periods in the one set of the 80 Hz heterodyne signal, and the phase may be obtained for the period in which the influence of the noise is similarly received in each of the plurality of sets. In addition, an average may be taken.

That is, the phases obtained respectively for the sampling numbers p, p+n, p+2n, . . . , (p+qn), . . . in the sampling numbers 1, 2, 3, 4, . . . being indicated for each period of the heterodyne signal of 80 Hz in FIG. 9 similarly receive the influence of the noise, and thus, the influence of the noise can be reduced by obtaining the phases of these sampling numbers. p is an integer of 1 or more and 4 or less, and q is a positive integer. On the other hand, when the phase of the sampling number different from the above is obtained, the influence of the noise is greatly received.

In addition, when the value of n is large, a change of the influence of the noise for a slight fluctuation of the heterodyne frequency becomes large, which is not preferable. From the above point of view, n is preferably set to 10 or less, and n is more preferably set to 1. Further, from the same point of view, m is preferably set to 10 or less, and m is more preferably set to 1.

Further, after the heterodyne frequency is set to the value of the rational multiple of the peak frequency, it is preferable to search for the heterodyne frequency at which fluctuations of the retardation and the displacement are minimized while changing the heterodyne frequency in small steps for fine adjustment.

The optical heterodyne interference measurement apparatus and the optical heterodyne interference measurement method are not limited to the embodiments and configuration examples described above, and various other modifications are possible.

The optical heterodyne interference measurement apparatus of the first aspect according to the above embodiment includes (1) a beam generation unit for generating and outputting a first light beam and a second light beam having optical frequencies different from each other by a heterodyne frequency and polarizations orthogonal to each other; (2) a first photodetector for detecting a temporal change of an intensity generated by heterodyne interference between the first light beam and the second light beam after any one or both of the first light beam and the second light beam are reflected by or transmitted through a measurement object, and outputting a first detection signal; (3) a setting unit for setting, when op is set to any peak frequency being temporally constant in a frequency spectrum of intensity noise included in the first light beam or the second light beam output from the beam generation unit, the heterodyne frequency being a difference between the optical frequencies of the first light beam and the second light beam output from the beam generation unit to a value of a rational multiple of the peak frequency $\omega_p$; and (4) an operation unit for acquiring information on the measurement object based on a phase of a component temporally changing sinusoidally at the heterodyne frequency in the first detection signal.

The optical heterodyne interference measurement apparatus of the second aspect according to the above embodiment includes (1) a beam generation unit for generating and outputting a first light beam and a second light beam having optical frequencies different from each other by a heterodyne frequency and polarizations orthogonal to each other based on light reflected by or transmitted through a measurement object; (2) a first photodetector for detecting a temporal change of an intensity generated by heterodyne interference between the first light beam and the second light beam, and outputting a first detection signal; (3) a setting unit for setting, when $\omega_p$ is set to any peak frequency being temporally constant in a frequency spectrum of intensity noise included in the first light beam or the second light beam output from the beam generation unit, the heterodyne frequency being a difference between the optical frequencies of the first light beam and the second light beam output from the beam generation unit to a value of a rational multiple of the peak frequency $\omega_p$; and (4) an operation unit for acquiring information on the measurement object based on a phase of a component temporally changing sinusoidally at the heterodyne frequency in the first detection signal.

The above measurement apparatus of the first aspect may further include a beam splitter for collectively splitting the first light beam and the second light beam output from the beam generation unit into two light beams, and outputting as first split light and second split light; and a second photodetector for detecting a temporal change of an intensity generated by heterodyne interference between the first light beam and the second light beam included in the second split light, and outputting a second detection signal, and the first photodetector may detect the temporal change of the intensity generated by the heterodyne interference between the first light beam and the second light beam after any one or both of the first light beam and the second light beam included in the first split light output from the beam splitter are reflected by or transmitted through the measurement object, and output the first detection signal, and the operation unit may acquire the information on the measurement object based on the phase of the component temporally changing at the heterodyne frequency in the first detection signal, and a phase of a component temporally changing at the heterodyne frequency in the second detection signal.

In the above measurement apparatus of the first or second aspect, when a ratio $\omega_h/\omega_p$ between the heterodyne frequency $\omega_h$ and the peak frequency $\omega_p$ is represented by a rational number n/m (each of m and n is a positive integer which has only unity as a common divisor), the setting unit may set the heterodyne frequency $\omega_h$ in which n is set to 10 or less. Further, in this case, the setting unit may set the heterodyne frequency $\omega_h$ in which n is set to 1.

In the above measurement apparatus of the first or second aspect, when a ratio $\omega_h/\omega_p$ between the heterodyne frequency $\omega_h$ and the peak frequency $\omega_p$ is represented by a rational number n/m (each of m and n is a positive integer which has only unity as a common divisor), the setting unit may set the heterodyne frequency $\omega_h$ in which m is set to 10 or less. Further, in this case, the setting unit may set the heterodyne frequency $\omega_h$ in which m is set to 1.

In the above measurement apparatus of the first or second aspect, the setting unit may set the heterodyne frequency $\omega_h$ to the same value as the peak frequency $\omega_p$.

In the above measurement apparatus of the first or second aspect, the operation unit may acquire the information on the measurement object based on the phase of the component temporally changing at the heterodyne frequency in the first detection signal, and a phase of an electric signal temporally changing at the heterodyne frequency generated in the beam generation unit.

In the above measurement apparatus of the first or second aspect, the beam generation unit may include a frequency shifter for generating and outputting the first light beam and the second light beam based on laser light output from a laser light source.

In the above measurement apparatus of the first or second aspect, the operation unit may acquire, as the information on the measurement object, at least one information of a retardation of the measurement object, a displacement of the measurement object, a refractive index change of the measurement object, a surface shape of the measurement object, and a surface roughness of the measurement object.

The optical heterodyne interference measurement method of the first aspect according to the above embodiment includes (1) a beam generation step of generating and outputting a first light beam and a second light beam having optical frequencies different from each other by a heterodyne frequency and polarizations orthogonal to each other; (2) a first photodetection step of detecting a temporal change of an intensity generated by heterodyne interference between the first light beam and the second light beam by a first photodetector after any one or both of the first light beam and the second light beam are reflected by or transmitted through a measurement object, and outputting a first detection signal; (3) a setting step of setting, when $\omega_p$ is set to any peak frequency being temporally constant in a frequency spectrum of intensity noise included in the first light beam or the second light beam output in the beam generation step, the heterodyne frequency being a difference between the optical frequencies of the first light beam and the second light beam output in the beam generation step to a value of a rational multiple of the peak frequency $\omega_p$; and (4) an operation step of acquiring information on the measurement object based on a phase of a component temporally changing sinusoidally at the heterodyne frequency in the first detection signal.

The optical heterodyne interference measurement method of the second aspect according to the above embodiment includes (1) a beam generation step of generating and outputting a first light beam and a second light beam having optical frequencies different from each other by a heterodyne frequency and polarizations orthogonal to each other based on light reflected by or transmitted through a measurement object; (2) a first photodetection step of detecting a temporal change of an intensity generated by heterodyne interference between the first light beam and the second light beam by a first photodetector, and outputting a first detection signal; (3) a setting step of setting, when $\omega_p$ is set to any peak frequency being temporally constant in a frequency spectrum of intensity noise included in the first light beam or the second light beam output in the beam generation step, the heterodyne frequency being a difference between the optical frequencies of the first light beam and the second light beam output in the beam generation step to a value of a rational multiple of the peak frequency $\omega_p$; and (4) an operation step of acquiring information on the measurement object based on a phase of a component temporally changing sinusoidally at the heterodyne frequency in the first detection signal.

The above measurement method of the first aspect may further include a splitting step of collectively splitting the first light beam and the second light beam output from the beam generation step into two light beams by a beam splitter, and outputting as first split light and second split light; and a second photodetection step of detecting a temporal change of an intensity generated by heterodyne interference between the first light beam and the second light beam included in the second split light by a second photodetector, and outputting a second detection signal, and in the first photodetection step, the temporal change of the intensity generated by the heterodyne interference between the first light beam and the second light beam may be detected by the first photodetector after any one or both of the first light beam and the second light beam included in the first split light output from the beam splitter are reflected by or transmitted through the measurement object, and the first detection signal may be output, and in the operation step, the information on the measurement object may be acquired based on the phase of the component temporally changing at the heterodyne frequency in the first detection signal, and a phase of a component temporally changing at the heterodyne frequency in the second detection signal.

In the above measurement method of the first or second aspect, in the setting step, when a ratio $\omega_h/\omega_p$ between the heterodyne frequency $\omega_h$ and the peak frequency $\omega_p$ is represented by a rational number n/m (each of m and n is a positive integer which has only unity as a common divisor), the heterodyne frequency $\omega_h$ in which n is set to 10 or less may be set. Further, in this case, in the setting step, the heterodyne frequency $\omega_h$ in which n is set to 1 may be set.

In the above measurement method of the first or second aspect, in the setting step, when a ratio $\omega_h/\omega_p$ between the heterodyne frequency $\omega_h$ and the peak frequency $\omega_p$ is represented by a rational number n/m (each of m and n is a positive integer which has only unity as a common divisor), the heterodyne frequency $\omega_h$ in which m is set to 10 or less may be set. Further, in this case, in the setting step, the heterodyne frequency $\omega_h$ in which m is set to 1 may be set.

In the above measurement method of the first or second aspect, in the setting step, the heterodyne frequency $\omega_h$ may be set to the same value as the peak frequency $\omega_p$.

In the above measurement method of the first or second aspect, in the operation step, the information on the measurement object may be acquired based on the phase of the component temporally changing at the heterodyne frequency in the first detection signal, and a phase of an electric signal temporally changing at the heterodyne frequency generated in the beam generation step.

In the above measurement method of the first or second aspect, in the beam generation step, the first light beam and the second light beam may be generated and output by a frequency shifter based on laser light output from a laser light source.

In the above measurement method of the first or second aspect, in the operation step, as the information on the measurement object, at least one information of a retardation of the measurement object, a displacement of the measurement object, a refractive index change of the measurement object, a surface shape of the measurement object, and a surface roughness of the measurement object may be acquired.

INDUSTRIAL APPLICABILITY

The embodiments can be used as an optical heterodyne interference measurement apparatus and an optical heterodyne interference measurement method capable of reducing influence of noise.

REFERENCE SIGNS LIST

1-3—optical heterodyne interference measurement apparatus, 10—beam generation unit, 11—laser light source, 12—half wave plate, 13—quarter wave plate, 14—laser driver, 15—motor, 16—motor driver, 21—beam splitter, 22—polarizing beam splitter, 31—mirror, 33—quarter wave plate, 41—first photodetector, 42—linear polarizer, 51—second photodetector, 52—linear polarizer, 53—quarter wave plate, 60—AD conversion unit, 70—computer, 90—measurement object.

The invention claimed is:

1. An optical heterodyne interference measurement apparatus comprising:

a laser light source configured to generate and output a first light beam and a second light beam having optical frequencies different from each other by a heterodyne frequency and polarizations orthogonal to each other;

a first photodetector configured to detect a temporal change of an intensity generated by heterodyne interference between the first light beam and the second light beam after any one or both of the first light beam and the second light beam are reflected by or transmitted through a measurement object, and output a first detection signal; and a computer configured to set, when $\omega_p$ is set to any peak frequency being temporally constant in a frequency spectrum of intensity noise included in the first light beam or the second light beam output from the laser light source, the heterodyne frequency being a difference between the optical frequencies of the first light beam and the second light beam output from the laser light source to a value of a rational multiple of the peak frequency $\omega_p$, and configured to acquire information on the measurement object based on a phase of a component temporally changing sinusoidally at the heterodyne frequency in the first detection signal.

2. The optical heterodyne interference measurement apparatus according to claim 1, further comprising:

a beam splitter configured to collectively split the first light beam and the second light beam output from the laser light source into two light beams, and output as first split light and second split light; and a second photodetector configured to detect a temporal change of an intensity generated by heterodyne interference between the first light beam and the second light beam included in the second split light, and output a second detection signal, wherein the first photodetector is configured to detect the temporal change of the intensity generated by the heterodyne interference between the first light beam and the second light beam after any one or both of the first light beam and the second light beam included in the first split light output from the beam splitter are reflected by or transmitted through the measurement object, and output the first detection signal, and the computer is configured to acquire the information on the measurement object based on the phase of the component temporally changing at the heterodyne frequency in the first detection signal, and a phase of a component temporally changing at the heterodyne frequency in the second detection signal.

3. The optical heterodyne interference measurement apparatus according to claim 1, wherein, when a ratio $\omega_h/\omega_p$ between the heterodyne frequency $\omega_h$ and the peak frequency $\omega_p$ is represented by a rational number n/m (each of m and n is a positive integer which has only unity as a common divisor), the computer is configured to set the heterodyne frequency $\omega_h$ in which n is set to 10 or less.

4. The optical heterodyne interference measurement apparatus according to claim 3, wherein the computer is configured to set the heterodyne frequency $\omega_h$ in which n is set to 1.

5. The optical heterodyne interference measurement apparatus according to claim 1, wherein, when a ratio $\omega_h/\omega_p$ between the heterodyne frequency $\omega_h$ and the peak frequency $\omega_p$ is represented by a rational number n/m (each of m and n is a positive integer which has only unity as a common divisor), the computer is configured to set the heterodyne frequency $\omega_h$ in which m is set to 10 or less.

6. The optical heterodyne interference measurement apparatus according to claim 5, wherein the computer is configured to set the heterodyne frequency $\omega_h$ in which m is set to 1.

7. The optical heterodyne interference measurement apparatus according to claim 1, wherein the computer is configured to set the heterodyne frequency $\omega_h$ to the same value as the peak frequency $\omega_p$.

8. The optical heterodyne interference measurement apparatus according to claim 1, wherein the computer is configured to acquire the information on the measurement object based on the phase of the component temporally changing at the heterodyne frequency in the first detection signal, and a phase of an electric signal temporally changing at the heterodyne frequency generated in the laser light source.

9. The optical heterodyne interference measurement apparatus according to claim 1, wherein the laser light source includes a frequency shifter configured to generate and output the first light beam and the second light beam based on laser light output from the laser light source.

10. The optical heterodyne interference measurement apparatus according to claim 1, wherein the computer is configured to acquire, as the information on the measurement object, at least one information of a retardation of the measurement object, a displacement of the measurement object, a refractive index change of the measurement object, a surface shape of the measurement object, and a surface roughness of the measurement object.

11. An optical heterodyne interference measurement apparatus comprising:

a laser light source configured to generate and output a first light beam and a second light beam having optical frequencies different from each other by a heterodyne frequency and polarizations orthogonal to each other based on light reflected by or transmitted through a measurement object;

a first photodetector configured to detect a temporal change of an intensity generated by heterodyne interference between the first light beam and the second light beam, and output a first detection signal; and a computer configured to set, when Op is set to any peak frequency being temporally constant in a frequency spectrum of intensity noise included in the first light beam or the second light beam output from the laser light source, the heterodyne frequency being a difference between the optical frequencies of the first light beam and the second light beam output from the laser light source to a value of a rational multiple of the peak frequency $\omega_p$, and configured to acquire information on the measurement object based on a phase of a component temporally changing sinusoidally at the heterodyne frequency in the first detection signal.

12. An optical heterodyne interference measurement method comprising:

generating and outputting a first light beam and a second light beam having optical frequencies different from each other by a heterodyne frequency and polarizations orthogonal to each other;

detecting a temporal change of an intensity generated by heterodyne interference between the first light beam and the second light beam by a first photodetector after any one or both of the first light beam and the second light beam are reflected by or transmitted through a measurement object, and outputting a first detection signal;

setting, when $\omega_p$ is set to any peak frequency being temporally constant in a frequency spectrum of intensity noise included in the first light beam or the second light beam output in the beam generation, the heterodyne frequency being a difference between the optical frequencies of the first light beam and the second light beam output in the beam generation to a value of a rational multiple of the peak frequency $\omega_p$; and acquiring information on the measurement object based on a phase of a component temporally changing sinusoidally at the heterodyne frequency in the first detection signal.

13. The optical heterodyne interference measurement method according to claim 12, further comprising:

collectively splitting the first light beam and the second light beam output from the beam generation into two light beams by a beam splitter, and outputting as first split light and second split light; and detecting a temporal change of an intensity generated by heterodyne interference between the first light beam and the second light beam included in the second split light by a second photodetector, and outputting a second detection signal, wherein detecting the temporal change of the intensity generated by the heterodyne interference between the first light beam and the second light beam by the first photodetector after any one or both of the first light beam and the second light beam are reflected by or transmitted through the measurement object, and outputting the first detection signal includes:

detecting the temporal change of the intensity generated by the heterodyne interference between the first light beam and the second light beam by the first photodetector after any one or both of the first light beam and the second light beam included in the first split light output from the beam splitter are reflected by or transmitted through the measurement object, and outputting the first detection signal, and acquiring the information on the measurement object based on the phase of the component temporally changing sinusoidally at the heterodyne frequency in the first detection signal includes:

acquiring the information on the measurement object based on the phase of the component temporally changing at the heterodyne frequency in the first detection signal, and a phase of a component temporally changing at the heterodyne frequency in the second detection signal.

14. The optical heterodyne interference measurement method according to claim 12, wherein setting, when $\omega_p$ is set to any peak frequency being temporally constant in the frequency spectrum of intensity noise included in the first light beam or the second light beam output in the beam generation, the heterodyne frequency being the difference between the optical frequencies of the first light beam and the second light beam output in the beam generation to the value of the rational multiple of the peak frequency $\omega_p$ includes:

when a ratio $\omega_h/\omega_p$ between the heterodyne frequency $\omega_h$ and the peak frequency $\omega_p$ is represented by a rational number n/m (each of m and n is a positive integer which has only unity as a common divisor), setting the heterodyne frequency $\omega_h$ in which n is set to 10 or less.

15. The optical heterodyne interference measurement method according to claim 14, wherein when the ratio $\omega_h/\omega_p$ between the heterodyne frequency $\omega_h$ and the peak frequency $\omega_p$ is represented by the rational number n/m (each of m and n is a positive integer which has only unity as a common divisor), setting the heterodyne frequency $\omega_h$ in which n is set to 1.

16. The optical heterodyne interference measurement method according to claim 12, wherein setting, when $\omega_p$ is set to any peak frequency being temporally constant in the frequency spectrum of intensity noise included in the first light beam or the second light beam output in the beam generation, the heterodyne frequency being the difference between the optical frequencies of the first light beam and the second light beam output in the beam generation to the value of the rational multiple of the peak frequency $\omega_p$ includes:

when a ratio $\omega_h/\omega_p$ between the heterodyne frequency $\omega_h$ and the peak frequency $\omega_p$ is represented by a rational number n/m (each of m and n is a positive integer which has only unity as a common divisor), setting the heterodyne frequency $\omega_h$ in which m is set to 10 or less.

17. The optical heterodyne interference measurement method according to claim 16, wherein when the ratio $\omega_h/\omega_p$ between the heterodyne frequency $\omega_h$ and the peak frequency $\omega_p$ is represented by the rational number n/m (each of m and n is a positive integer which has only unity as a common divisor, setting the heterodyne frequency $\omega_h$ in which m is set to 1.

18. The optical heterodyne interference measurement method according to claim 12, wherein setting, when $\omega_p$ is set to any peak frequency being temporally constant in the frequency spectrum of intensity noise included in the first light beam or the second light beam output in the beam generation, the heterodyne frequency being the difference between the optical frequencies of the first light beam and the second light beam output in the beam generation to the value of the rational multiple of the peak frequency $\omega_p$ includes:

setting the heterodyne frequency $\omega_h$ is set to the same value as the peak frequency $\omega_p$.

19. The optical heterodyne interference measurement method according to claim 12, wherein acquiring the information on the measurement object based on the phase of the component temporally changing sinusoidally at the heterodyne frequency in the first detection signal includes:

acquiring the information on the measurement object based on the phase of the component temporally changing at the heterodyne frequency in the first detection signal, and a phase of an electric signal temporally changing at the heterodyne frequency generated in the beam generation.

20. The optical heterodyne interference measurement method according to claim 12, wherein generating and outputting the first light beam and the second light beam having optical frequencies different from each other by the heterodyne frequency and polarizations orthogonal to each other includes:

generating and outputting the first light beam and the second light beam by a frequency shifter based on laser light output from a laser light source.

21. The optical heterodyne interference measurement method according to claim 12, wherein acquiring the information on the measurement object based on the phase of the component temporally changing sinusoidally at the heterodyne frequency in the first detection signal includes:

acquiring, as the information on the measurement object, at least one information of a retardation of the measurement object, a displacement of the measurement object, a refractive index change of the measurement object, a surface shape of the measurement object, and a surface roughness of the measurement object.

22. An optical heterodyne interference measurement method comprising:

generating and outputting a first light beam and a second light beam having optical frequencies different from each other by a heterodyne frequency and polarizations orthogonal to each other based on light reflected by or transmitted through a measurement object;

detecting a temporal change of an intensity generated by heterodyne interference between the first light beam and the second light beam by a first photodetector, and outputting a first detection signal;

setting, when $\omega_p$ is set to any peak frequency being temporally constant in a frequency spectrum of intensity noise included in the first light beam or the second light beam output in the beam generation, the heterodyne frequency being a difference between the optical frequencies of the first light beam and the second light beam output in the beam generation to a value of a rational multiple of the peak frequency $\omega_p$, and acquiring information on the measurement object based on a phase of a component temporally changing sinusoidally at the heterodyne frequency in the first detection signal.

* * * * *